June 21, 1927. 1,633,086
W. J. FOX
MOTOR CYCLE TRAILER ATTACHMENT
Filed June 18, 1926 3 Sheets-Sheet 1
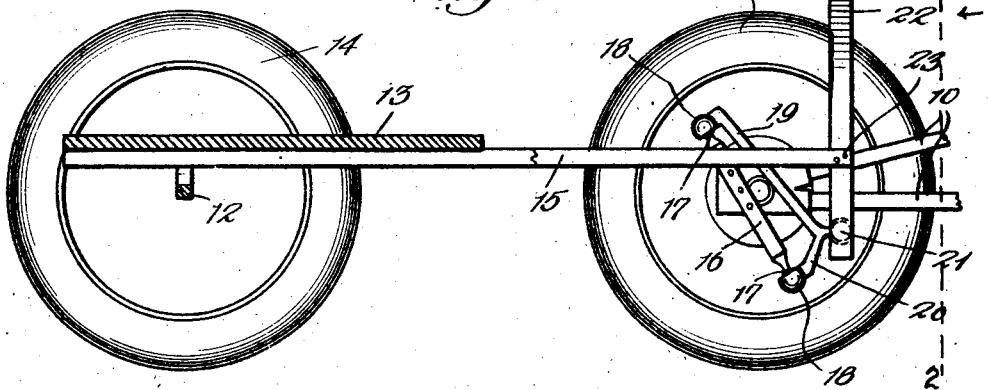
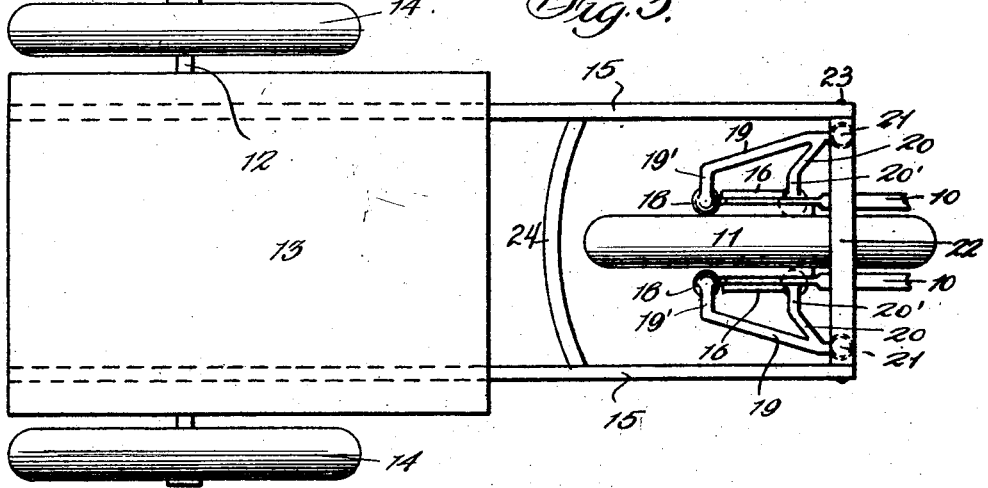
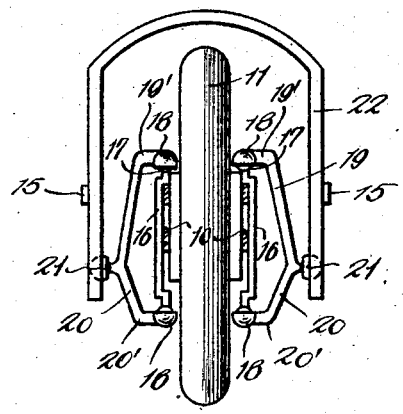
INVENTOR.
W. J. Fox
BY Jack A. Schley
ATTORNEY.

June 21, 1927.

W. J. FOX 1,633,086

MOTOR CYCLE TRAILER ATTACHMENT

Filed June 18, 1926

INVENTOR.
W. J. Fox
BY
Jack A. Sehley
ATTORNEY.

June 21, 1927.
W. J. FOX
1,633,086
MOTOR CYCLE TRAILER ATTACHMENT
Filed June 18, 1926
3 Sheets-Sheet 3
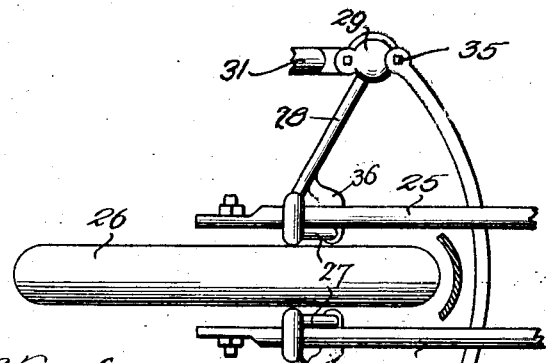
Fig. 6.
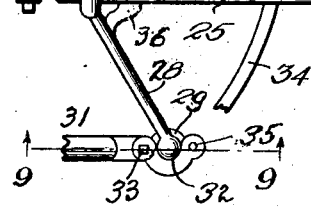
Fig. 7.
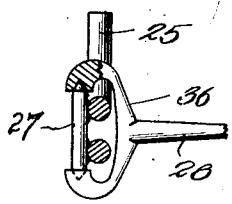
Fig. 8.
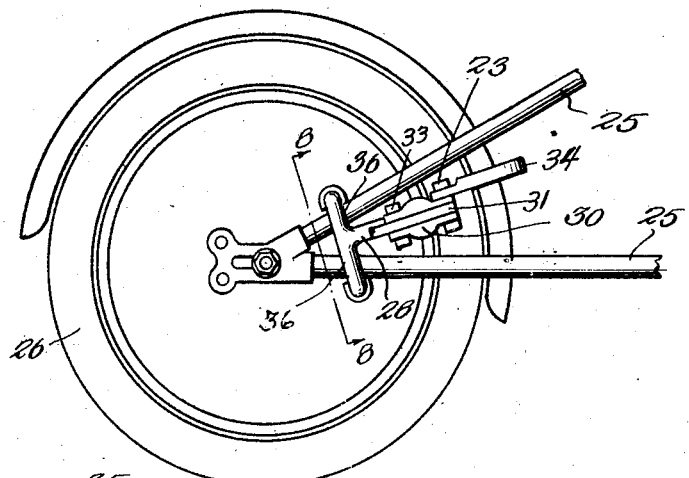
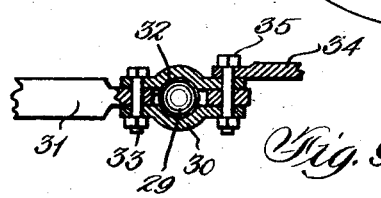
Fig. 9.
INVENTOR.
W. J. Fox
BY Jack A. Sehley
ATTORNEY Patented June 21, 1927.

1,633,086

UNITED STATES PATENT OFFICE.

WERNER J. FOX, OF NEW ORLEANS, LOUISIANA.

MOTOR CYCLE TRAILER ATTACHMENT.

Application filed June 18, 1926. Serial No. 116,901.

This invention relates to a motorcycle trailer attachment, and particularly to a stabilizing construction adapted to equalize the movement of the trailer as the motorcycle is inclined incident to negotiating a curve. This application comprises a division in part of my copending application filed March 21, 1925, Serial No. 17,231.

The general objects of the invention, as explained in said application, are the control of the trailer to obviate all skidding or side movement thereof as the motorcycle traverses a curve and this result is accomplished by a compensating movement of the opposite reaches of the trailer at their point of connection with the rear of the motorcycle. Such movement is effected by a lateral inclination of the motorcycle causing more stress upon the reach next the curve and transmitting motion to the opposite reach by which a transverse movement is effected at the axle of the trailer.

This form of the invention involves a simplified construction having its only point of attachment to the motorcycle at the axle of its rear wheel where a rearwardly inclined post or bar is secured for the purpose of establishing upper and lower points of contact and pivotally connected to a member extending outwardly and forwardly and having a swivel connection for the forward reach of the trailer.

A further object of the invention is to provide an improved construction wherein the inclined post or bar carries pivots at its opposite ends from which outwardly directed bars extend and join at a pivotal connection for the trailer reach.

Another object of the invention is to present a new form of connection between the pivoted bars connected to the trailer reaches so that the movement of the bars upon side of the motorcycle will be directly transmitted to the opposite side producing a corresponding movement of the reach upon that side of the vehicle.

Other and further objects and advantages of the invention will be hereinafter set forth and the novel features thereof defined by the appended claims.

In the drawings:

Fig. 1 is a side elevation of the invention,

Fig. 2 is a vertical section on line 2—2 of Fig. 1,

Fig. 3 is a detail plan of the rear motorcycle wheel and trailer,

Fig. 6 is a partial plan of a further modified form,

Fig. 7 is a side elevation of the same,

Fig. 8 is a detail section on line 8—8 of Fig. 7, and

Fig. 9 is a similar view on line 9—9 of Fig. 6.

Like numerals refer to like parts in the several figures of the drawings.

Figure 5:
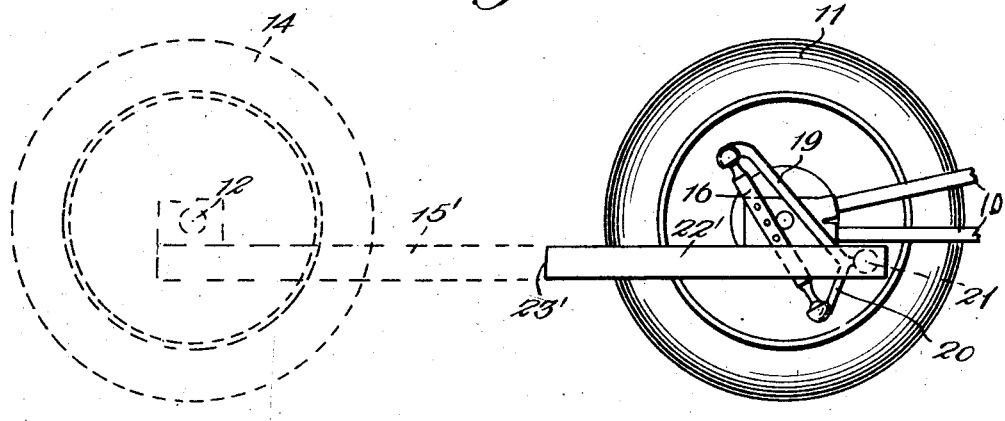
Fig. 5 is a side elevation of such modification.

In the preferred form of the invention shown in Figs. 1, 2 and 3 the numeral 10 designates the frame of a motorcycle of any desired construction, the rear wheel 11 of which is connected with the axle 12 of a trailer 13 which has the ground wheels 14. This connection is effected by the opposite forwardly extending reaches 15 connected to the axle 12 at the trailer end and pivotally connected at its opposite end adjacent the axle of the wheel 11. This connection may be effected by various devices, a desirable construction being the post 16 secured to the motorcycle frame and rearwardly inclined with ball members 17 at its upper and lower ends to cooperate with sockets 18 upon the bars 19 and 20, to form a pivotal or swivelled connection. The upper bar 19 has its end angularly bent at 19' adjacent its pivot and extends thence outwardly and forwardly, while the lower bar 20 is similarly bent at 20' and joins the bar 19 at the ball and socket connection 21 for the connecting link or arch 22. This arrangement produces a triangular assemblage at each side of the motorcycle connected by the arch which prevents tendency of the reaches to spread and transmit motion from one side to the other. This arch is also rigidly connected to the opposite reaches 15 at 23 and thus provides for holding the motorcycle upright when traveling in a perpendicular plane and for inclining the motorcycle within the arch when it deviates from said plane incident to traversing a curve to thereby transfer the motion of the arms next the inner side of the curve to those at the outer side thereof. The reaches may be suitably braced as at 24.

Figure 4:
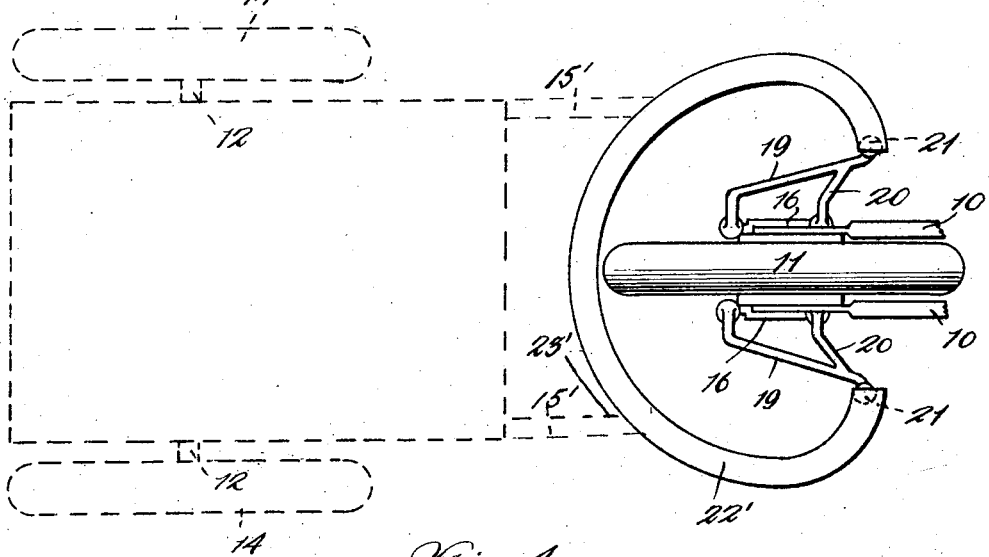
Fig. 4 is a similar view of a modified form of the connecting arch.

In Figs. 1, 2 and 3 the arch 22 has been shown in a vertical plane but this is not essential, as it may be disposed in a horizontal plane as shown at 22' in Figs. 4 and 5 where the reaches 15′ are connected to the body of the arch at 23′. In this modification the remaining parts are similar to those before described.

The modified form of the invention shown in Figs. 6 to 9 is disclosed in my application filed March 21, 1925, Serial No. 17,231 and the numeral 25 therein indicates the frame of a motorcycle adjacent the rear wheel 26 thereof. This frame carries at opposite sides the rearwardly inclined conebearing posts 27 which cooperate with the bearing yokes 36 having the outwardly inclined arm 28 terminating in a bearing ball 29 at its free end engaged in a socket formed by the opposite plates 30. The forward portion of the reaches 31 is cut-out at 32 to receive the ball between the plates which are secured to the reach at 33 and also to the connecting arch 34 at 35. This arch or link is disposed in a substantially horizontal plane and connects the triangle assemblages at opposite sides of the motorcycle to effect a synchronizing motion in opposite directions of the arms 28.

The operation of the several forms of the invention is substantially the same, as the rearward inclination of the pivoting post effects a tilting movement of the arm at one side and a lifting movement on the other side as the motorcycle is leaned toward the inside of the road curve. This effects a shifting of the center of gravity which is due to the fact that the swivel joints are located forwardly of the pivoted joints and the motion of one arm is transferred to the other and the connected reach, resulting in a transverse shifting of the trailer axle causing it to track behind the motorcycle. This operation is also affected by the increased resistance at the inner wheel of the trailer when making a curve which through the reach moves backward the arm at that side and shifts the parallel reach in an opposite direction to effect the action just described. When travelling in a straight line the motorcycle is afforded a direct draft on the trailer and held in perpendicular position to support a portion of the trailer weight and be free for turning. The center of gravity between the outer extremities of the attachment is in common with the center of gravity of the motorcycle when both are perpendicular, but when the motorcycle is inclined transversely its center of gravity is shifted to the inside of the curve being made, while the center of gravity of the trailer remains substantially constant and acts to counterbalance the displaced center of the motorcycle. The invention reduces the possibility of skidding or overturning to a minimum and provides a stabilizer and equalizer for both the motorcycle and trailer when negotiating a curve, while the motorcycle is automatically restored to upright position.

While the specific details of construction have been shown and described, still the invention is not confined thereto as changes and alterations may be made therein without departing from the spirit thereof as defined by the following claims.

What I claim, is:

1. In a device of the class described, the combination of inclined posts, outwardly and forwardly directed members having their inner ends pivoted to opposite ends of said posts, ball and socket joints at the outer ends of the members, and a link connecting the ball and socket joints.

2. In a device of the class described, the combination of inclined posts, outwardly and forwardly directed bifurcated members having their inner ends pivoted to opposite ends of said posts, and a connecting member pivoted to the forward ends of said bifurcated members.

3. In a device of the class described, the combination of pivoting posts, outwardly directed members pivotally connected with the opposite ends of said posts, and a connection between the members swivelled to the outer ends thereof.

4. In a device of the class described, the combination of inclined posts, outwardly directed members pivotally connected with the opposite ends of the posts, a connection between the members swivelled to the outer ends thereof, and a trailer having reaches secured to said connection.

5. In a device of the class described, rearwardly inclined posts adapted to be secured to a motorcycle frame and having bearings at their opposite ends, converging arms extending from said bearings and connected at their meeting ends, and a connection swivelled at said meeting ends and adapted to receive the forward reaches of a trailer.

6. In a device of the class described, a post having bearings at its opposite ends, an arm member having angularly disposed end portions engaging said bearings and converging bars extending from said portions and provided at their opposite ends with a pivotal bearing for a trailer connection.

In testimony whereof I affix my signature.

WERNER J. FOX.